Patented May 12, 1925.

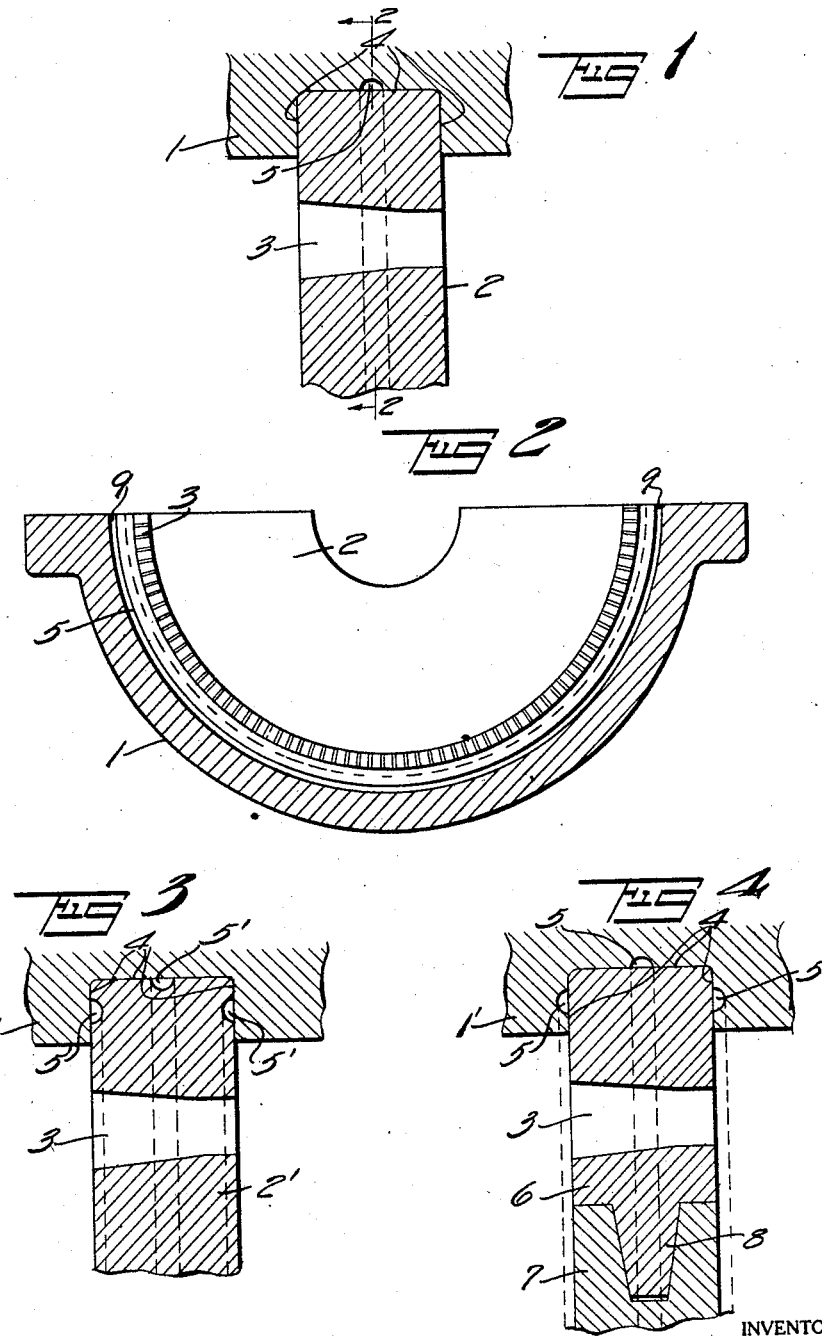

1,537,176

UNITED STATES PATENT OFFICE.

FRANZ LÖSEL, OF BRUNN, CZECHOSLOVAKIA.

TURBINE CONSTRUCTION.

Application filed August 15, 1924. Serial No. 732,305.

*To all whom it may concern:*

Be it known that I, FRANZ LÖSEL, a citizen of Czechoslovakia, residing at Brunn, Czechoslovakia, have invented certain new and useful Improvements in Turbine Constructions, of which the following is a specification.

This invention relates to elastic fluid turbines especially steam turbines.

The object of the invention generally is a novel turbine construction permitting quick and ready disassembly of certain parts thereof.

In steam turbines in which the stationary guide nozzles or diaphragms are carried in ring grooves formed on the interior of the turbine casing or special carrier body, it is often difficult to disconnect or disassemble the diaphragms or nozzles from the grooves because of the tendency of the parts to corrode and stick tightly together, and the forced separation of the adhering parts sometimes results in injury to them. By my invention these difficulties are obviated and I effect this by so constructing the turbine that the corroded or adhering parts may be readily lubricated with a rust soluble medium which frees the adhering surfaces and permits the unimpeded separation or disconnection of the parts.

For a better understanding of the invention, including the above indicated novel features of construction and others which will hereinafter appear, reference may be had to the accompanying drawings, wherein:

Fig. 1 is a partial longitudinal sectional view of a turbine embodying my invention;

Fig. 2 is a sectional view at right angles to Fig. 1 along the line 2—2;

Fig. 3 is a partial longitudinal view showing a modification, and

Fig. 4 is a partial longitudinal view showing a further modification of the invention.

Referring to Figs. 1 and 2 the turbine casing or the guide nozzle carrier is indicated at 1 and a stationary guide nozzle carrier 2 such for example as the usual diaphragm having the nozzle canal 3 is carried within an annular groove 4, the carrier 2 being adapted to fit more or less loosely within the groove 4 without the necessity for any special attaching devices. The guide nozzle carrier 2 tends, after continued use, to stick very tightly within the grooves 4 of the main carrying or guide member 1 due to the corrosion which takes place at the abutting surfaces and the parts become stuck or frozen so tightly together that it is difficult for them to be disconnected or disassembled and often causes resultant injury and scoring of the abutting surfaces when they are forcefully separated. The diaphragm in particular is susceptible to injury from this cause. In order to loosen the frozen sections and assist in the disconnection and disassembly of the parts, I have provided a small ring passage or small groove 5 at the abutting surfaces for the reception of a lubricating or rust soluble fluid before attempting to disassemble the parts. Suitable fluid for this purpose is petroleum or petroleum products, and by introducing such a fluid into the groove 5 it tends to penetrate very quickly the whole of the abutting surfaces and to dissolve the corroded and adhering surfaces thereby freeing them and permitting disassembling with the utmost facility. The arrows 9 indicate points where the solution may be introduced.

In the particular embodiment illustrated in Figs. 1 and 2, only a single lubricating groove 5 is provided and in this instance in the turbine casing or special diaphragm carrier 1. In some instances it may be desired to provide more than one receiving groove, as for example in Fig. 4 I have illustrated three such grooves 5, one each in the three walls of the annular groove of rectangular formation 4 formed in the turbine casing or special carrier 1. In Fig. 3 I have indicated a modification wherein the lubricating grooves 5' are formed in the guide nozzle elements 2' instead of in the turbine casing or special carrier, there being in this modification an annular groove 5' in each of the abutting surfaces of the guide nozzle element 2'. In both Figs. 3 and 4 the lubrication and solution are effected very readily after the introduction of the rust soluble medium into the three grooves 5' resulting in a very ready and quick disconnection and disassembly of the parts. The small ring passings or grooves 5 and 5' may have any desired form and section and in the embodiments herein exhibited are indicated as of rounded form.

The embodiment of Fig. 4 also shows a modification wherein the guide nozzle elements 6 are made separate and distinct from the diaphragm 7, the former having wedge-shaped feet 8 fitting into similarly shaped grooves in the diaphragm.

Having thus described my invention, what I claim and desire to protect by Letters Patent is:

1. A steam turbine comprising a guide nozzle carrier or guide member carrier with a guide groove on the interior thereof and a guide nozzle member disposed in said groove with its surfaces abutting against certain surfaces of the groove and one of said members having a groove or channel communicating with the abutting surfaces and adapted to receive a rust soluble medium.

2. A steam turbine comprising a guide nozzle carrier or guide member carrier having on the interior thereof an annular rectangular shaped guide groove and a guide nozzle element disposed in said guide groove and having certain surfaces thereof abutting against certain of the surfaces of the groove, said guide nozzle guide member also having a groove or channel formed in one of the groove walls and communicating with the abutting surfaces of the said members for the reception of a rust soluble medium.

3. A turbine construction comprising a turbine casing or guide nozzle carrier having on the interior thereof an annular guide groove and a guide nozzle element having its peripheral edge fitting within said groove with certain of its surfaces abutting the surfaces of the guide groove and one of said abutting surfaces having a lubricating groove or channel formed therein for the reception of a rust soluble medium.

4. A steam turbine of the character set forth in claim 1 wherein the guide nozzle members are of arcuate segmental form and when fitted together constitute a continuous disc like member with its peripheral edge fitting into the guide groove of annular formation on the interior of the carrier or guide member.

5. An elastic fluid turbine comprising a turbine casing or guide member carrier and a guide nozzle disk or diaphragm therein connected with the same by means of abutting surfaces having a lubricating groove or channel formed in one of them for the reception of a rust soluble medium.

6. An elastic fluid turbine comprising a turbine casing or guide member carrier and a guide nozzle disk or diaphragm therein in tight connection with the same by means of a groove and abutting surfaces between the walls of said groove and diaphragm, said abutting surfaces having a lubricating groove or channel formed in one of them for the reception of a rust soluble medium.

7. An elastic fluid turbine comprising a turbine casing or a guide member carrier and a guide nozzle disk or diaphragm therein in tight connection with the same by means of a groove and abutting surfaces, including such as are cylindrical between the walls of said groove and the diaphragm, said abutting surfaces having a lubricating groove or channel formed in one of them for the reception of a rust soluble medium.

8. An elastic fluid turbine comprising a turbine casing or guide member carrier and a guide nozzle member or guide disc therein, having fluid passages near the periphery thereof and being in fluid tight connection at its periphery with said casing or carrier, said guide nozzle member and guide member carrier having abutting surfaces provided with at least one lubricating groove or channel formed in one of them for the reception of a rust soluble medium.

In testimony whereof, I have signed my name to this specification.

FRANZ LÖSEL.

Witnesses:
 OSCAR PRIEMAS,
 J. KNOTEK.